(12) United States Patent
Hawwa et al.

(10) Patent No.: US 8,783,297 B2
(45) Date of Patent: Jul. 22, 2014

(54) ROBOTIC SYSTEM FOR PIPELINE REHABILITATION

(75) Inventors: Muhammad A. Hawwa, Dhahran (SA); Kamal Youcef-Toumi, Cambridge, MA (US)

(73) Assignee: Massachusetts Institute of Technology, Cambridge, MA (US)

(*) Notice: Subject to any disclaimer, the term of this patent is extended or adjusted under 35 U.S.C. 154(b) by 266 days.

(21) Appl. No.: 13/409,207

(22) Filed: Mar. 1, 2012

(65) Prior Publication Data

US 2012/0273078 A1 Nov. 1, 2012

Related U.S. Application Data

(60) Provisional application No. 61/479,523, filed on Apr. 27, 2011.

(51) Int. Cl.
*F16L 55/16* (2006.01)

(52) U.S. Cl.
USPC ............. 138/98; 138/97; 138/118; 138/157; 405/150.1; 405/184.1

(58) Field of Classification Search
USPC ........... 138/97, 98, 119, 118, 157; 405/150.1, 405/151, 153, 184.1
See application file for complete search history.

(56) References Cited

U.S. PATENT DOCUMENTS

| | | | |
|---|---|---|---|
| 3,618,639 A | | 11/1971 | Daley et al. |
| 3,915,197 A | | 10/1975 | Piccirilli |
| 3,946,761 A | | 3/1976 | Thompson et al. |
| 3,958,607 A | | 5/1976 | Gray |
| 4,124,985 A | * | 11/1978 | Maimets ............. 405/150.1 |
| 4,257,459 A | * | 3/1981 | Jenks ................. 138/147 |
| 4,627,471 A | | 12/1986 | Parkes et al. |
| 5,040,283 A | | 8/1991 | Pelgrom |
| 5,042,532 A | | 8/1991 | Gilleland |
| 5,076,618 A | * | 12/1991 | Bridges .............. 285/370 |
| 5,263,515 A | * | 11/1993 | Goodale ............. 138/98 |
| 5,423,630 A | | 6/1995 | Imoto |
| 5,465,758 A | * | 11/1995 | Graf et al. .......... 138/98 |

(Continued)

FOREIGN PATENT DOCUMENTS

| | | |
|---|---|---|
| GB | 2018384 A * | 10/1979 |
| KR | 10-0961211 B1 | 6/2010 |
| WO | 9319322 | 9/1993 |

OTHER PUBLICATIONS

The International Search Report and Written Opinion issued in Connection with International Patent Application No. PCT/US2012/027694 mailed on Oct. 12, 2012.

(Continued)

*Primary Examiner* — Patrick F Brinson
(74) *Attorney, Agent, or Firm* — Sam Pasternack; MIT Technology Licensing Office

(57) ABSTRACT

System for pipeline rehabilitation. The system includes repairing a leak in a pipe using a pair of substantially semi-cylindrical parts connected through a compliant joint. When the parts are compressed, the semi-cylindrical parts form a cylinder whose outside diameter is less than the inside diameter of a pipe with a defect thereby allowing the cylinder to be inserted into the pipe at a location of a leak. Once in place, the parts engage the inside surface of the pipe when the compression is released thereby to seal the leak.

11 Claims, 4 Drawing Sheets

(56) References Cited

U.S. PATENT DOCUMENTS

| | | | |
|---|---|---|---|
| 5,638,592 A * | 6/1997 | O'Toole et al. | 29/469.5 |
| 5,727,597 A | 3/1998 | Fisco | |
| 6,019,136 A | 2/2000 | Walsh et al. | |
| 6,123,027 A * | 9/2000 | Suyama et al. | 104/138.2 |
| 6,626,447 B2 | 9/2003 | Nelson et al. | |
| 6,755,592 B2 * | 6/2004 | Janssen | 405/184.1 |
| 6,820,653 B1 * | 11/2004 | Schempf et al. | 138/98 |
| 7,306,693 B2 * | 12/2007 | Weatherby et al. | 156/293 |
| 7,523,764 B2 | 4/2009 | Lepola et al. | |
| 7,661,443 B1 | 2/2010 | Miksis | |
| 2010/0243093 A1 | 9/2010 | Wilson | |
| 2010/0263759 A1 * | 10/2010 | Maimets et al. | 138/98 |

OTHER PUBLICATIONS

Notification Concerning Transmittal of International Preliminary Report on Patentability for International Patent Application No. PCT/US2012/027694 mailed on Nov. 7, 2013.

* cited by examiner

Steps Illustrating The Patch Application Process

ROBOTIC SYSTEM FOR PIPELINE REHABILITATION

This application claims priority to provisional application No. 61/479,523 filed on Apr. 27, 2011, the contents of which is incorporated herein by reference.

BACKGROUND OF THE INVENTION

This invention relates to a robot system for pipeline rehabilitation and more particularly to such a system that deploys an expandable patch to the location of a leak in a pipe to seal the leak.

Pipelines, regardless of the fluid they transport (water, gas, chemical fluids), often suffer from leakage. Causes of leakage may include excessive pressure within a pipe, corrosion within a pipe as a result of reactions with the moving fluid or the surrounding medium, cracks due to aging and other factors, and defects that arise as a result of poor workmanship or lack of proper maintenance.

Pipeline leakage may present serious environmental and/or economic problems. Therefore, it is important that leaks be quickly detected, located and repaired. It is often the case that pipeline networks are built as an underground infrastructure or a submerged system. Two challenges therefore exist in attempting to repair pipeline networks that form an underground infrastructure. First of all, the replacement of a defective segment of pipe may not be a reasonable choice because of the pipe's location underground. Second, an external access to a defective part of a pipe wall might not be easy to secure. In this case, a process for curing a defect in an internal wall of a defective pipe can be the appropriate approach.

There are known techniques for repairing a leaking pipe from inside the pipe. For example, spraying an epoxy coating on the inside of the pipe may be used to extend the life of an existing pipe by increasing its strength and protecting it from corrosion or abrasion. It is also known to insert a new pipe (usually plastic) into an existing defective pipe in which the old and new pipes are fused together using heat. Yet another technique for repairing a pipe from the inside is to bond a flexible fabric tube onto the defective pipe wall using a thermosetting resin followed by injection of steam or hot water for curing the resin. It is also known to insert a preformed polyethylene or polyvinyl chloride pipe formed into a U-shape before insertion into the defective pipe. Thereafter, steam or hot water may be used for expanding the U-shaped pipe to seal a leak.

It is an object of the present invention to use a robot for mechanically applying a patch to the inside of a defective wall.

SUMMARY OF THE INVENTION

In a first aspect, the invention is a patch for repairing a leak in a pipe including a pair of substantially semi-cylindrical parts connected through a compliant joint, whereupon when compressed, the semi-cylindrical parts form a cylinder whose outside diameter is less than the inside diameter of the pipe thereby allowing the cylinder to be inserted into the pipe at a location of a leak. Once at the location of the leak, the parts expand and engage the inside surface of the pipe when the compression is released so as to seal the leak. It is preferred that the semi-cylindrical parts are made of an elastomeric material having a modulus of elasticity greater than that of the compliant joint. The elastomeric material may include magnetic particles dispersed therein for use with ferrous pipes. In this embodiment, it is preferred that each semi-cylindrical part have a structure extending from an inside wall allowing the two parts to be compressed together. A preferred configuration of this structure is a ring.

In yet another embodiment of this aspect of the invention, each of the semi-cylindrical parts has an inside wall shaped to produce an outward radial force when fluid is flowing through the cylinder within the pipe. The semi-cylindrical parts may also include a pair of O-rings spaced apart along the semi-cylindrical part that will engage the inner wall of the pipe when the compression is released. The O-rings may include magnetic particles dispersed therein.

In a particularly preferred embodiment, the system includes a robotic device for compressing the cylinder, moving the cylinder to the location of a leak and releasing the compression to allow the cylinder to cover the leak.

In another aspect, the leak repairing system of the invention includes a robotic vehicle adapted for movement along the inside of a pipe, the robotic vehicle including structure for compressing an elastomeric patch for insertion into the pipe and for releasing the compression allowing the patch to cover a leak in the pipe. It is preferred that the robotic vehicle include a driver, control hardware, a light source, a camera and an actuator for compressing and releasing the patch at a leak location. The robotic vehicle may be controlled using an electrical wire or it may be controlled wirelessly. The robotic vehicle may be controlled and monitored by a computer.

DESCRIPTION OF THE PREFERRED EMBODIMENT

An aim of this invention is to provide a robotic device and method for rehabilitating a leaking pipeline. More specifically, the invention includes a patch that may be adhered to the inside wall of a cylindrical pipe at the location of a defect so as to eliminate fluid leakage.

Figure 1:
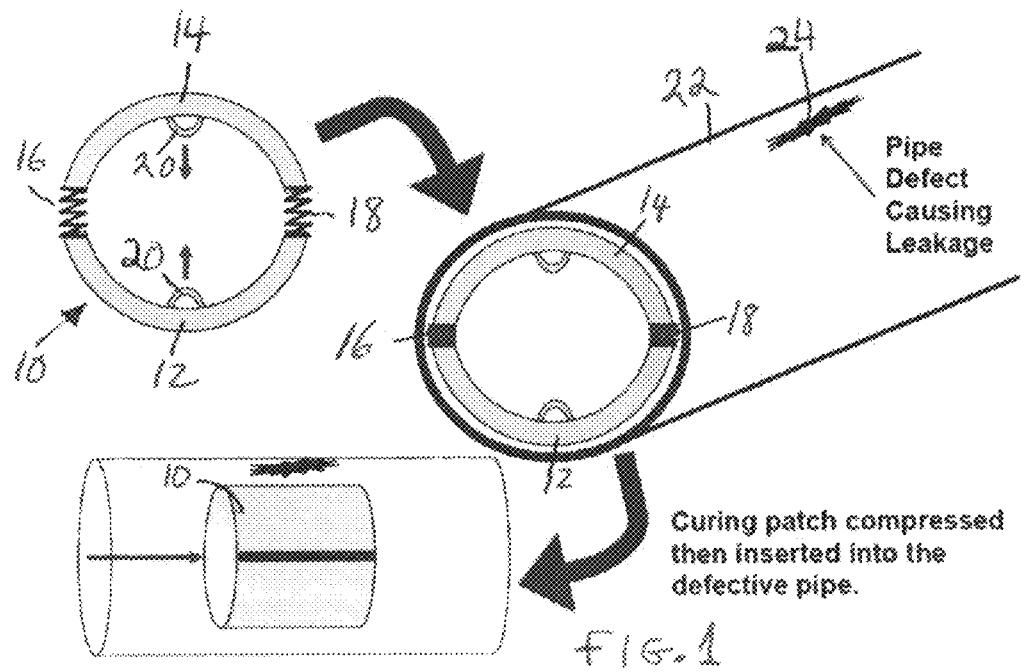
FIG. 1 includes perspective views of an embodiment of the invention disclosed herein.

With reference first to FIG. 1, a patch 10 is made of two approximately semi-cylindrical parts 12 and 14 that are made of an elastomeric, or rubbery, material. The two semi-cylindrical parts 12 and 14 are connected to each other through much softer joints 16 and 18 that are illustrated as springs. In this embodiment, each of the semi-cylindrical parts 12 and 14 have a ring 20 supported by the inside wall so that the patch 10 can be handled conveniently. If a pipe to be repaired is ferromagnetic, the patch 10 may include tiny magnetic particles dispersed within the elastomeric material to aid in forming a tight seal. Those of skill in the art will recognize that the patch 10 may have more than the two parts 12 and 14 and more than the two joints 16 and 18 if desired. For example, the patch 10 could include three or four elements instead of the two shown in FIG. 1.

As shown in FIG. 1, when the parts 12 and 14 are compressed towards one another, the two semi-cylindrical pieces 12 and 14 assume the shape of a cylinder whose outer diameter is less than the inside diameter of a defective pipeline 22 that includes a defect 24 causing leakage.

The elastomeric cylinder 10 is inserted into the defective pipe until it is adjacent to the location of the defect 24. The cylinder is then released to allow it to adhere to the inside wall of the pipe 22 resulting from the mechanical force transmitted by the springs 16 and 18 and thereby covering the defect 24. If the pipe 22 is ferrous pipe, the patch 10 may host tiny dispersed magnetic particles allowing the magnetic force to maintain the patch in the proper location.

Figure 2:
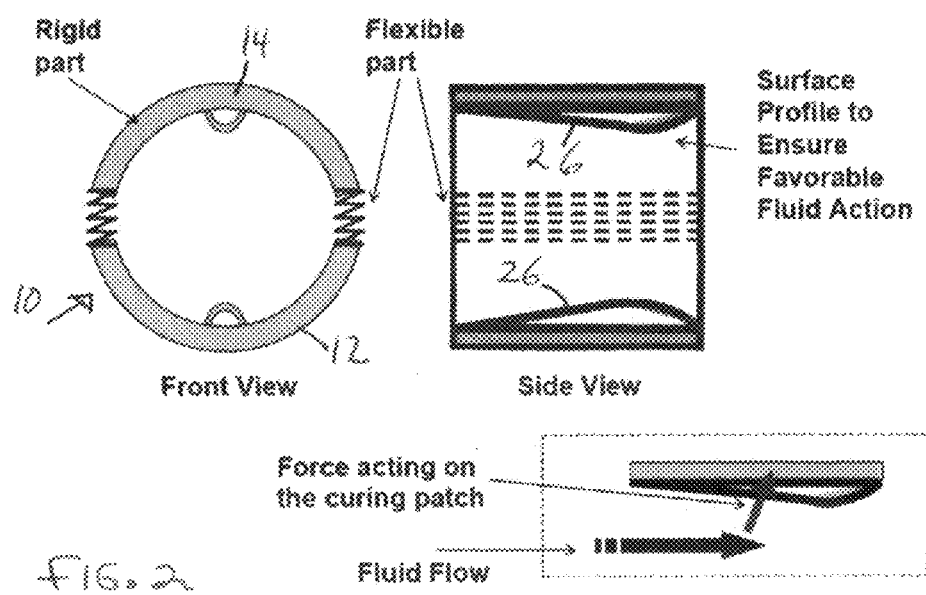
FIG. 2 is a schematic illustration of a suitable patch showing surface profiling to ensure favorable fluid action while providing a radial force.

With reference now to FIG. 2, the patch 10 includes an inside surface 26 that is shaped to cause the fluid flow to apply a substantially radial force on the patch 10 while at the same time maintaining a laminar flow profile at the patch region.

Figure 3:
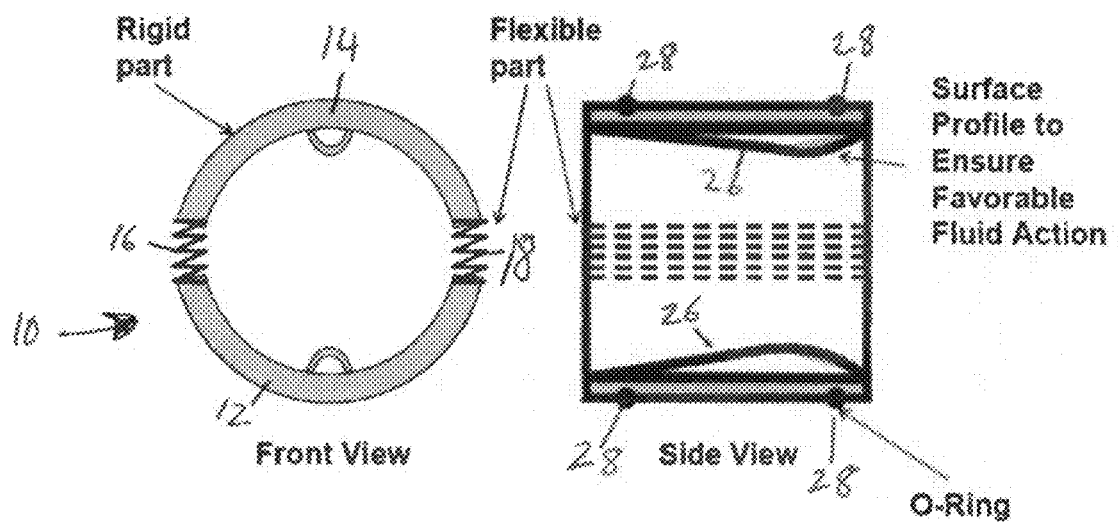
FIG. 3 shows cross-sectional views of the invention including O-rings in this embodiment.

FIG. 3 shows yet another embodiment of the invention disclosed herein. In the embodiment of FIG. 3, O-rings 28 are made of a rubbery material hosting tiny dispersed magnetic particles. In this embodiment it is no longer necessary to have the parts 12 and 14 include dispersed magnetic particles since they are now provided in the O-rings 28 to help secure the patch 10 in place.

Figure 4:
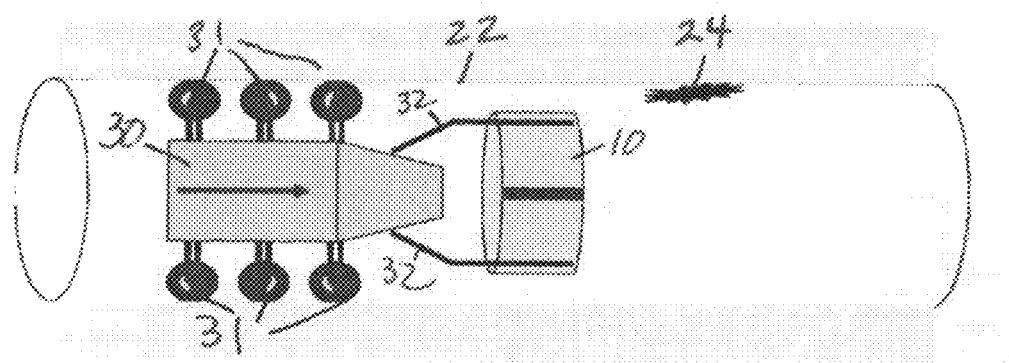
FIG. 4 is a schematic illustration of a robotic vehicle moving a patch to a leak location.

FIG. 4 shows a robotic vehicle 30 traveling through the pipe 22 on wheels 31 while supporting the patch 10 on a pair of arms 32. The arms 32 are adapted to compress the parts 12 and 14 of the patch 10 so that it can be moved to the position of the defect 24.

Figure 5:
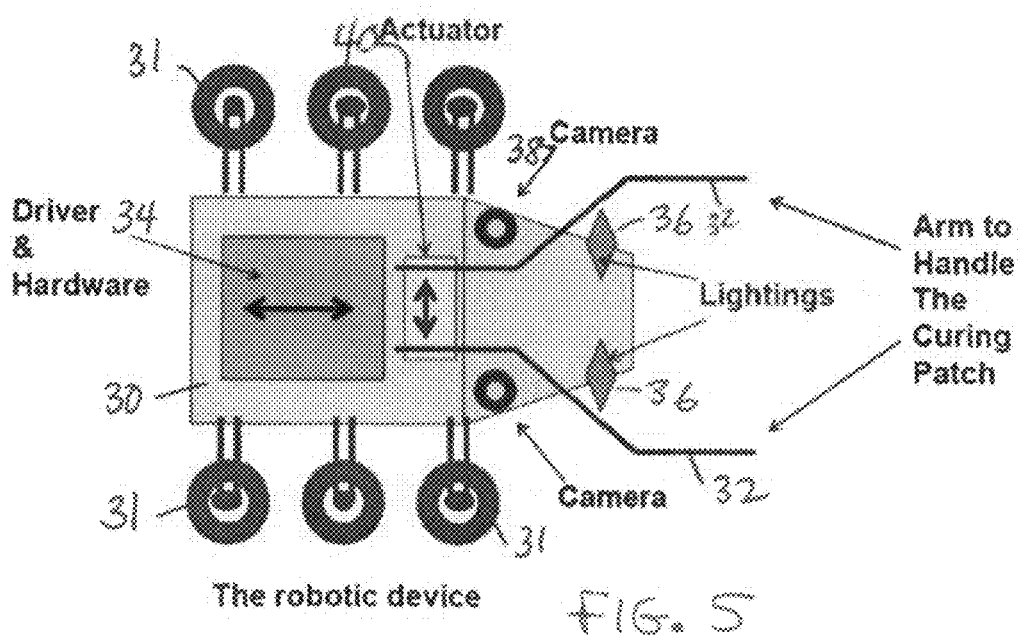
FIG. 5 is a schematic illustration of the robotic device according to an embodiment of the invention disclosed herein.
Figure 6:
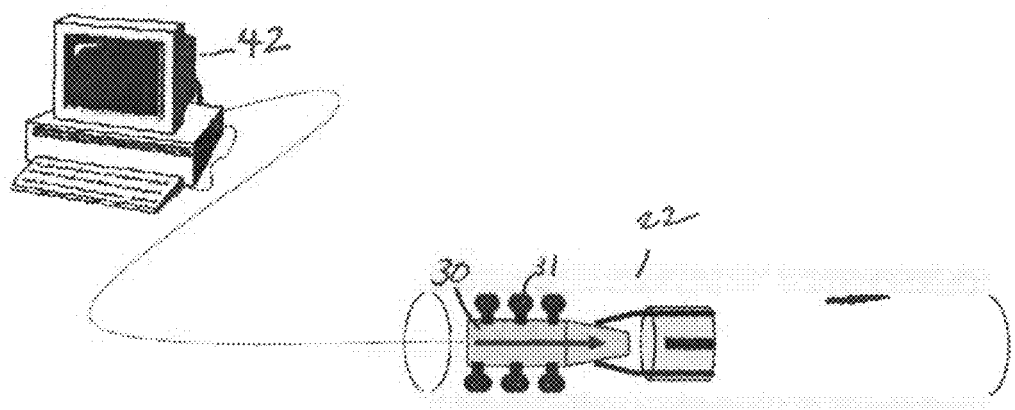
FIG. 6 is a schematic illustration of a computer monitoring and controlling a robotic vehicle.

FIG. 5 shows more detail of the robotic vehicle 30. The robotic vehicle 30 includes driver and hardware 34, lights 36, a camera 38 and an actuator 40 connected to the arms 32 for handling the patch 10. The lights 36 and camera 38 can be replaced by other known interrogating systems such as ultrasonic or infrared monitoring systems. The actuator 40 can compress or release the cylindrical patch as needed. As shown in FIG. 6, the robotic vehicle 30 can be driven along the pipeline 22 using a wire connected to a computer 42. Those of ordinary skill in the art will recognize that the robotic vehicle 30 may be controlled wirelessly by the computer 42.

Figure 7:
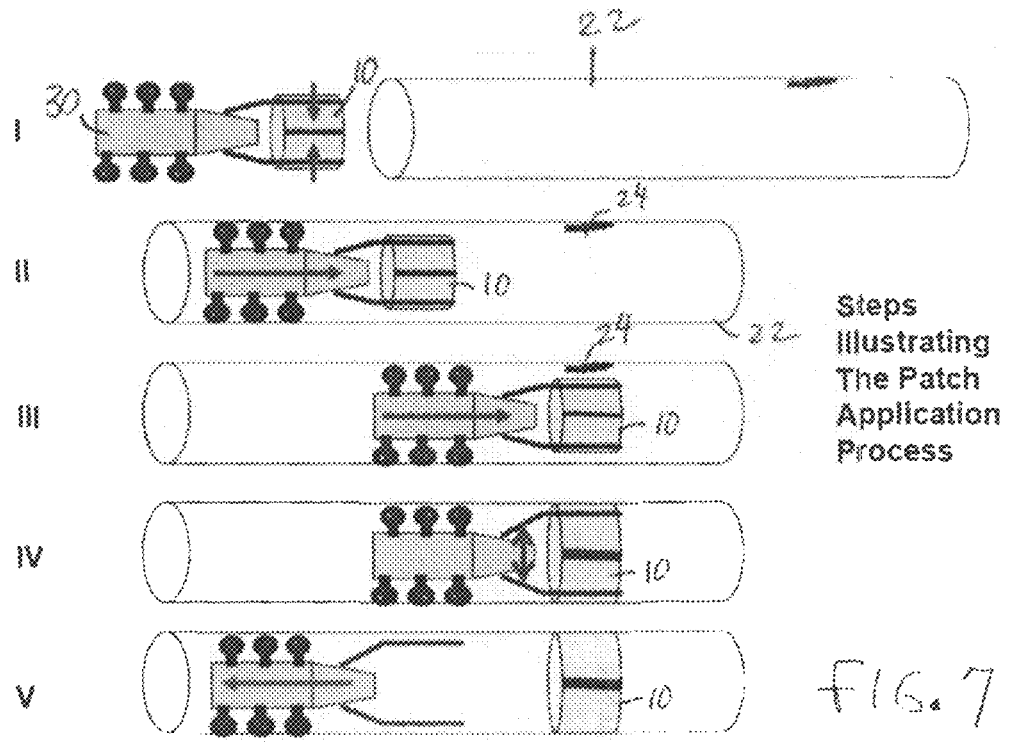
FIG. 7 shows several views of the robotic device inserting the patch at a leak location and then withdrawing after the leak is sealed.

The operation of the pipeline rehabilitation system disclosed herein is a series of steps as shown in FIG. 7. The robotic vehicle 30 enters the pipe 22 with the patch 10 in its compressed state. The robotic vehicle 30 moves the patch 10 to the location of the leak 24 whereupon the actuator 40 releases the compression so that the patch 10 covers and repairs the defect 24. Thereafter, the robotic vehicle 30 is retracted from the pipe.

Figure 8:
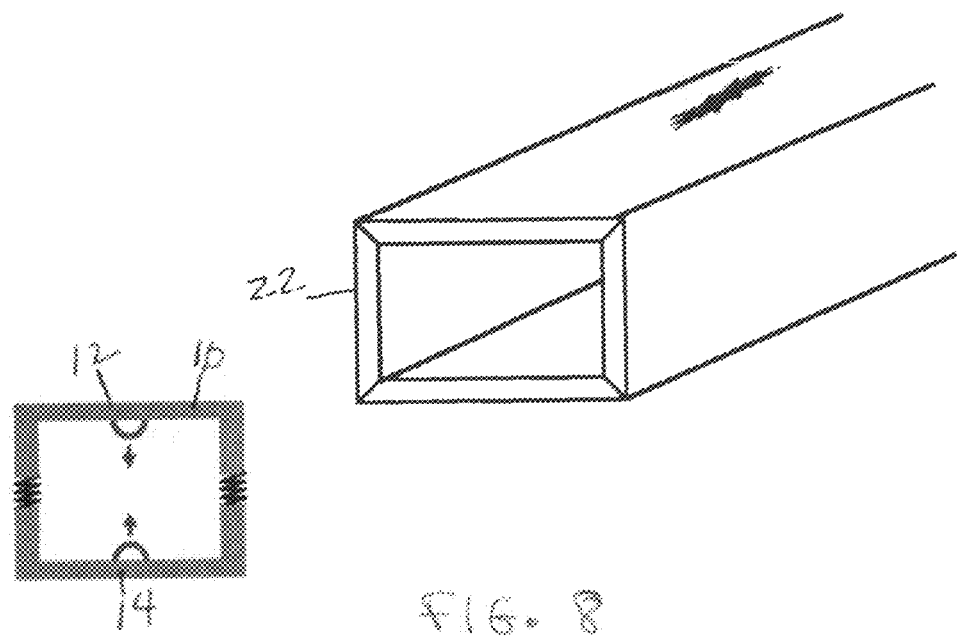
FIG. 8 shows a noncircular cross section of an embodiment of the patch of the invention used to repair pipes that do not have a circular cross section.

FIG. 8 shows that the present invention may be used in pipes that do not have a circular cross section. In the embodiment shown in FIG. 8 the pipe 22 has a rectangular cross section and the patch 10 is made of parts 12 and 14 that are rectilinear in this embodiment so as to fit within the rectangular pipe 22.

Modifications and variations of the present invention will be apparent to those of ordinary skill in the art and it is intended that all such modifications and variations be included within the scope of the appended claims.

What is claimed is:

1. Patch for repairing a leak in a pipe comprising:
a pair of substantially semi-cylindrical parts connected through a compliant joint, whereupon when compressed, the semi-cylindrical parts form a cylinder whose outside diameter is less than the inside diameter of the pipe allowing the cylinder to be inserted into the pipe and moved to a location of a leak, whereupon the parts engage the inside surface of the pipe when the compression is released to seal the leak.

2. The patch of claim 1 wherein the semi-cylindrical parts are made of an elastomeric material having a modulus of elasticity greater than that of the compliant joint.

3. The patch of claim 2 wherein the elastomeric material includes magnetic particles dispersed therein for use with ferrous pipes.

4. The patch of claim 1 wherein each semi-cylindrical part has structure extending from an inside wall allowing the two parts to be compressed together.

5. The patch of claim 4 wherein the structure is a ring.

6. The patch of claim 1 wherein each semi-cylindrical part has an inside wall shaped produce an outward radial force when fluid is flowing through the cylinder within the pipe.

7. The patch of claim 1 wherein each semi-cylindrical part includes a pair of O-rings spaced apart along the semi-cylindrical part that will engage the inner wall of the pipe when the compression is released.

8. The patch of claim 7 wherein the O-rings include magnetic particles dispersed therein.

9. The patch of claim 1 further including a robotic device for compressing the cylinder, moving the cylinder to the location of a leak and releasing the compression to allow the cylinder to cover the leak.

10. The patch of claim 1 wherein the cylinder has a circular cross section.

11. The patch of claim 1 wherein the cylinder has a non-circular cross section.

* * * * *

UNITED STATES PATENT AND TRADEMARK OFFICE
CERTIFICATE OF CORRECTION

PATENT NO. : 8,783,297 B2  
APPLICATION NO. : 13/409207  
DATED : July 22, 2014  
INVENTOR(S) : Muhammad A. Hawwa and Kamal Youcef-Toumi Page 1 of 1

It is certified that error appears in the above-identified patent and that said Letters Patent is hereby corrected as shown below:

Title page, item (73), add the following: Assignee,

King Fahd University of Petroleum and Minerals, P.O. Box. 5041, Dhahran, 31261 Saudi Arabia Signed and Sealed this  
Twenty-ninth Day of September, 2015

Michelle K. Lee  
*Director of the United States Patent and Trademark Office*